Sept. 22, 1959  H. H. BUNDSCHUH  2,905,110
RAISED DOUGHNUT MAKING MACHINE
Filed Feb. 8, 1957  2 Sheets-Sheet 1

INVENTOR.
HARRY H. BUNDSCHUH
BY
Knox & Knox

Sept. 22, 1959      H. H. BUNDSCHUH      2,905,110
RAISED DOUGHNUT MAKING MACHINE
Filed Feb. 8, 1957      2 Sheets-Sheet 2
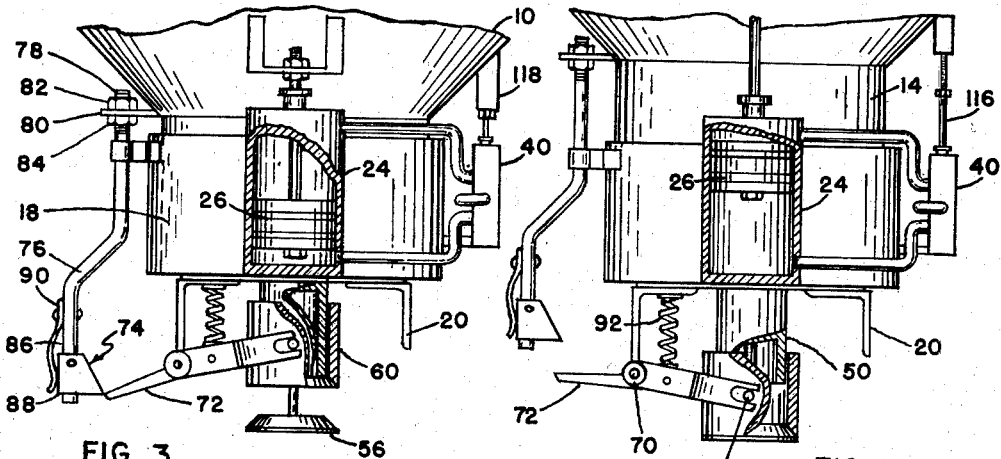
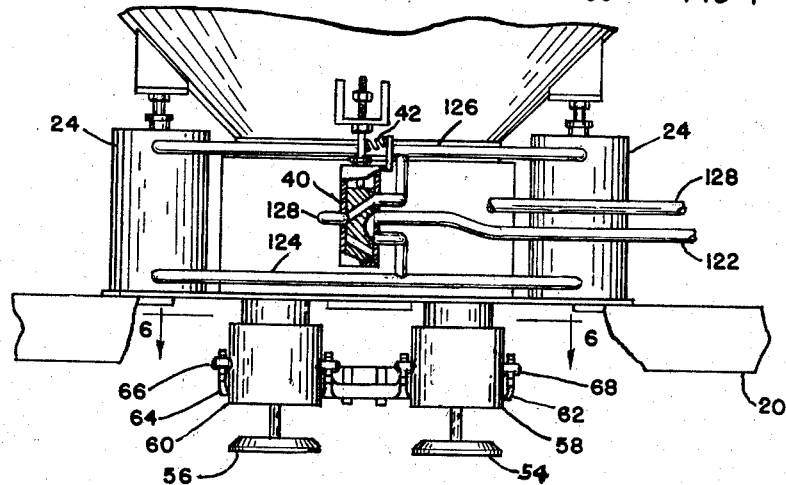
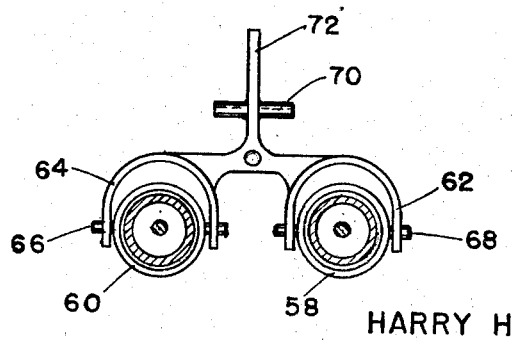
INVENTOR.
HARRY H. BUNDSCHUH
BY
Knox & Knox

United States Patent Office 2,905,110
Patented Sept. 22, 1959

2,905,110
RAISED DOUGHNUT MAKING MACHINE

Harry H. Bundschuh, San Diego, Calif.

Application February 8, 1957, Serial No. 639,160

7 Claims. (Cl. 107—14)

The present invention relates generally to improvements in dough batch cutters and more particularly to an extrusion device which measures, conditions, and forms doughnuts of yeast-raised doughs.

The primary object of this invention is to provide a device for kneading, conditioning, forming and extruding yeast raised doughs for doughnuts, by the use of mechanical pressure rather than air pressure applied to the dough mass so that positive extrusion of the dough is assured and uniform operation required for handling yeast raised dough is attained.

A further object of this invention is to provide in such a machine a dough hopper which combines a piston cooperating with a secondary dough chamber wherein the latter is a fixed cylinder within which the dough is compressed by the piston for its extrusion through orifices in the bottom of the cylinder.

A further object of this invention is to provide an automatic dough batch cutter which determines accurately the amount of material extruded at each stroke of the hopper-piston combination.

A further object is to provide a construction which insures that the dough chamber will clear itself of dough regularly and quickly and to ensure against deterioration of the product.

A further object is to provide pressure on the dough with progressive expression of the gases of fermentation, in contradistinction to prior art machines which cause inclusion of air in the dough, a result which cannot be tolerated when making doughnuts from yeast raised dough.

A further object of this invention is to provide a means whereby each batch of dough is a finished product, having been subjected to equal periods of kneading, fermenting and rising.

Finally, it is an object to provide a device of the aforementioned character which is simple, safe and convenient to use and which will give generally efficient and durable service.

With these objects definitely in view, along with other objects which will appear hereinafter as this description proceeds, this invention consists in the novel construction, combination and arrangement of elements and portions, as will be hereinafter fully described in the specification, particularly pointed out in the claims, and illustrated in the drawings which form a material part of this disclosure, and in which:

Figures 3 and 4 are fragmentary end elevational views showing the hopper at the bottom and top of its stroke, respectively;

Figure 5 is a fragmentary rear elevational view, taken from the side opposite to that shown in Figure 1; and Figure 6 is a plan view of the cut off sleeve actuating lever.

Figure 2:
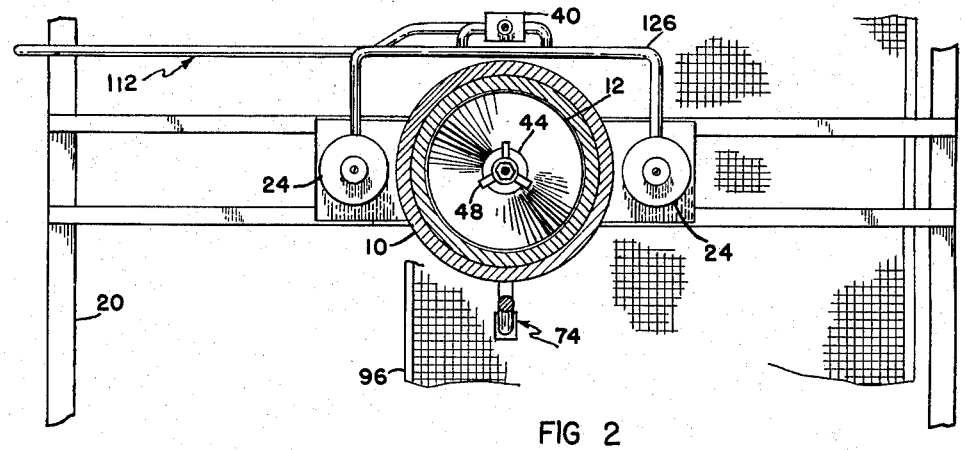
Figure 2 is a fragmentary sectional view, taken on the line 2—2 in Figure 1.
Figure 1:
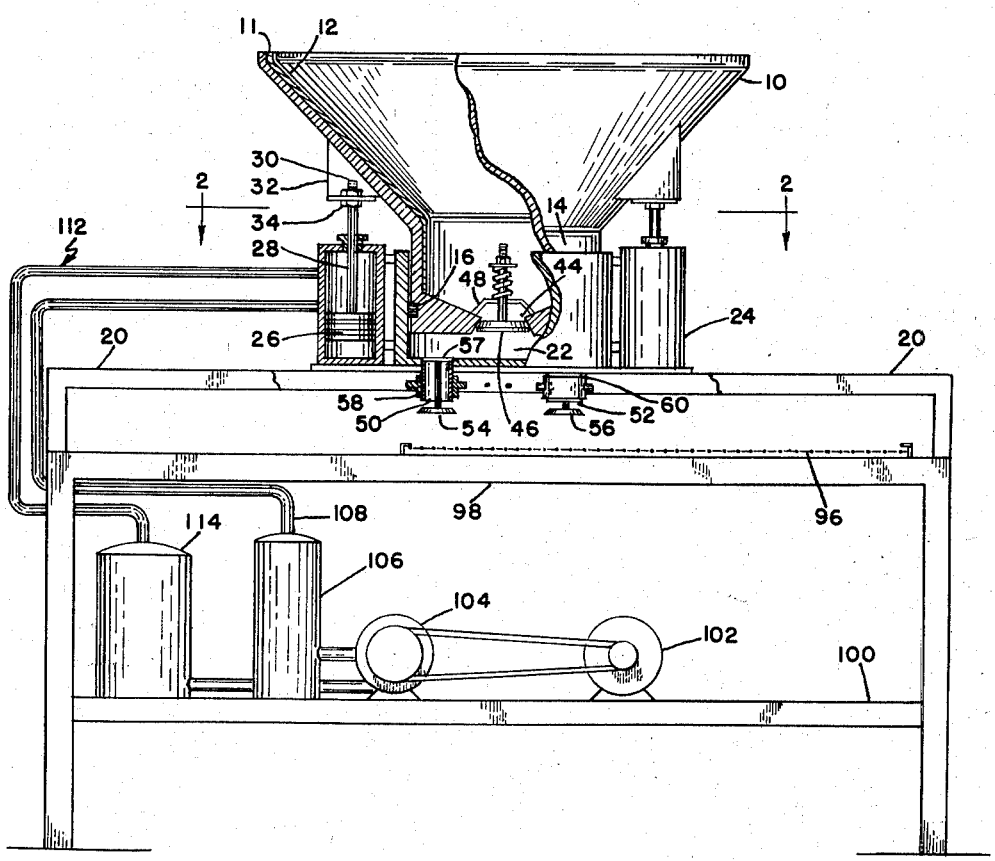
Figure 1 is a side elevational view of the machine, portions being broken away for better disclosure of the underlying parts and with the sleeve operating lever removed.

Referring now to the drawings in detail, the dough hopper 10 is of any suitable cross-sectional shape and is provided with a removable liner 11 which is adapted to receive a dough batch. The liner 11 has an inner lining of Teflon 12 or the equivalent for easy cleaning, and it should be carefully noted that the liner 11 does not cover the lower end of the piston 14, described immediately below, where dough adherence is desirable, uncoated steel having been found suitable in this regard, as a material for said lower end.

The lower end of the hopper has a hollow cylindrical depending piston 14 fitted with a piston ring 16 reciprocable within a cylinder 18 which is attached to the base frame 20. This cylinder, along with the closed end of the piston, defines the dough compression chamber 22. Also attached to the base frame 20 are two hydraulic reciprocators 24 which are identical in function and construction, each having a piston 26 and a piston rod 28 with a threaded end 30. The threaded ends 30 are secured to brackets 32 welded or otherwise attached to the hopper 10 and, by means of adjusting nuts 34, the throw of the hopper is made adjustable.

The reciprocators 24 serve to raise and lower the hopper 10 and its piston 14. A slide valve, 40, biased for snap action by the spring 42, controls fluid pressure means which will be described hereinafter, for raising and lowering the hopper, this slide valve 40 being shifted in response to the hopper movements. When the hopper 10 is charged, and upward stroke thereof creates a partial vacuum in the dough compression chamber 22 so that a measured mass of dough is drawn into the chamber through the throat 44 of a spring loaded valve 46 mounted in a spider 48 bridging the throat 44 in the piston of the hopper. On the return stroke, the included dough is under pressure and a portion thereof is extruded through the tubes 50 and 52. The compression chamber 22 is small in volume since the stroke of the piston is always small, on the order of one inch, and the chamber is substantially entirely freshly charged at each cycle of the machine. The tubes are two in number and have axially mounted cut off templates 54 and 56 supported by spiders 57 in the bottom of the cylinder. These templates are designed to coact with sleeve 58 and 60 mounted on said tubes 50 and 52. The templates are fixed, and the sleeves 58 and 60 are moved by a lever 70 having a pair of yokes 62 and 64 pivotally connected to the sleeves by cross-head pins or trunnions 66 and 68 unital with the sleeves 58 and 60. The fulcrum of the lever 70 is intermediate the yokes and the end 72 receiving the periodic application of impulse delivered thereto by a trip mechanism 74 attached to the hopper 10. This mechanism consists of a dependent arm 76, threaded at one end portion 78 and made adjustable in effective length as it is passed through an eye 80 on the hopper where adjustments are made with a nut 82 and set-nut 84 on the threaded portion 78. The other end of the arm 86 carries a one-way trip member 88 which is spring loaded as indicated at 90.

On the downward stroke of the hopper 10, the cut off sleeves 58 and 60 are raised against the compression spring 92 by their yokes 62 and 64. Near the end of the stroke, the lever 72 is released and the spring 92 snaps the sleeves downward, cutting off the doughnuts, not shown. The amount of material in the doughnuts is controlled by adjustment of the trip arm and to some extent by the pressure applied to the reciprocators 24.

A tray 96 of mesh wire is made to travel under the tubes 50 and 52, usually manually, for spacing the pairs of doughnuts as extruded, although this tray may be geared for automatic cooperation by a linkage not shown, The tray rests on the table 98. A sub-frame 100 supports the mechanisms necessary to pressurize fluid for the hydraulic reciprocators 24. The prime mover 102 is geared to a pump 104 delivering fluid under pressure to a compression tank 106, whence the liquid is distributed by means of the slide-valve 40 to the respective hydraulic reciprocators 24, by the piping system 112. A reservoir 114 is inserted in the piping system. The slide valve 40 is operated automatically by a valve stem 116 which is attached adjustably to the hopper 10 through an eye member 118 in which the threaded end of the valve stem slides. Nuts on each side of the eye member permit adjustment of the rod length and control of the hopper travel. To drive the hopper 10 upwardly fluid pressure is transmitted through the pipe 122 and the branch pipes 124 to the underside of the pistons 26 in the recprocators 24, fluid being allowed to escape from above the pistons 26, through the branch pipes 126 and the reservoir pipe 128. As explained hereinabove a quantity of dough passes down through the valve 57 into the chamber 22 during the upward stroke. When the hopper reaches the top of its stroke, as determined by the setting of the valve stem 116, the valve 40 is operated to effect a cross over of the connection to the pipes 122 and 128 so that the pressurized fluid from pipe 122 is directed to the branch pipes 126 and the tops of the pistons 26 to drive the hopper downwardly, and the extrusion of the dough through the tubes 50 and 52 is effected.

The general mode of operation will be obvious from the foregoing description. In recapitulation it might be added that the snap action of the trip mechanism 74 is necessarily adjusted, along with the adjustment of valve stem 116 for length of stroke, to assure the desired length of downward travel piston 14 before the trip 88 disengages from the lever 72. Such adjustments determine the weight of dough extruded at each cycle and hence the size of the doughnuts formed. The speed of operation is responsive to the pressure delivered through the pipe 122, the consistency of the dough and the size of doughnuts being formed.

Obviously minor variations from the disclosed form of this invention may be made, all within the spirit and scope of this invention. For example, the number of sleeves 58 and 60 may be varied, modified pressure distribution systems may be employed and the arrangement of the frame elements and the shapes of the various elements may be changed considerably without departing from the teaching in this disclosure, wherein the drawings and specification are proposed as illustrative rather than limiting.

I claim:

1. A dough extrusion machine comprising: a dough hopper, a hollow piston having an open end and a closed end, said open end opening into said hopper and attached thereto to form a throat therefor, a fixedly mounted open-ended cylinder fitted to said piston for a slidable pumping relationship therewith, a non-return valve mounted and positioned in said closed piston end so as to permit flow of dough therethrough in a direction away from said hopper, means to reciprocate said hopper and thereby reciprocate said piston and said cylinder having a closed end confronting said closed end of said piston and having outlet tubes; sleeves on said tubes; a fixed template disposed axially of said tubes adjacent the outlet ends hereof; whereby a limited quantity of dough approximately equal to the total amount of dough to be extruded into doughnut form for a single cycle of the machine is fed from said hopper, through said valve into said fixed cylinder between said closed ends upon movement of the piston in one direction, the same quantity of dough being extruded through said outlet tubes in the working stroke of the piston in the opposite direction; means for periodically moving said sleeves toward said templates to cut off extruded dough rings and means to time the movement of said sleeves with the completion of the movement of the hopper in the first mentioned direction.

2. A dough extrusion machine comprising: a dough hopper, a hollow piston having an open end and a closed end, said open end opening into said hopper and attached thereto to form a throat therefor, a fixedly mounted open-ended cylinder fitted to said piston for a slidable pumping relationship therewith, a non-return valve mounted and positioned in said closed piston end so as to permit flow of dough therethrough in a direction away from said hopper, means to reciprocate said hopper and thereby reciprocate said piston and said cylinder having a closed end confronting said closed end of said piston and having outlet tubes; sleeves on said tubes; a fixed template disposed axially of said tubes adjacent the outlet ends thereof; whereby a limited quantity of dough approximately equal to the total amount of dough to be extruded into doughnut form for a single cycle of the machine is fed from said hopper, through said valve into said fixed cylinder between said closed ends upon movement of the piston in one direction, the same quantity of dough being extruded through said outlet tubes in the working stroke of the piston in the opposite direction; means for periodically moving said sleeves toward said templates to cut off extruded dough rings; and means to time the movement of said sleeves with the completion of the movement of the hopper in the first mentioned direction; said cylinder and piston defining a dough compression chamber having a volume equal to the combined flow capacity of said tubes for a single cycle of the machine, whereby said chamber is substantially entirely freshly charged at each cycle.

3. A dough extrusion machine comprising: a dough hopper, a hollow piston having an open end and a closed end, said open end opening into said hopper and attached thereto to form a throat therefor, a fixedly mounted open-ended cylinder fitted to said piston for a slidable pumping relationship therewith, a non-return valve mounted and positioned in said closed piston end so as to permit flow of dough therethrough in a direction away from said hopper, means to reciprocate said hopper and thereby reciprocate said piston and said cylinder having a closed end confronting said closed end of said piston and having outlet tubes; sleeves on said tubes; a fixed template disposed axially of said tubes adjacent the outlet ends thereof; means for periodically moving said sleeves toward said templates to cut off extruded dough rings; and means to time the movement of said sleeves with the completion of the movement of the hopper in the first mentioned direction; the inner surface of said hopper being lined with a material having little adhesion to dough from the top of the hopper to a point close to the bottom of said piston; the inner surface of said piston adjacent said non-return valve being of a material having strong adhesion to dough.

4. A dough extrusion machine comprising: a dough hopper, a hollow piston having an open end and a closed end, said open end opening into said hopper and attached thereto to form a throat therefor, a fixedly mounted open-ended cylinder fitted to said piston for a slidable pumping relationship therewith, a non-return valve mounted and positioned in said closed piston end so as to permit flow of dough therethrough in a direction away from said hopper, means to reciprocate said hopper and thereby reciprocate said piston and said cylinder having a closed end confronting said closed end of said piston and having outlet tubes; sleeves on said tubes; a fixed template disposed axially of said tubes adjacent the outlet ends thereof; means for periodically moving said sleeves toward said templates to cut off extruded dough rings; and means to time the movement of said sleeves with the completion of the movement of the hopper in the first mentioned direction; the hopper having a liner extending into the upper part of said piston; said liner having an inner lining of material having little adhesion to dough; the inner surface of said piston adjacent said non-return valve being of a material having strong adhesion to dough.

5. A dough extrusion machine comprising: a dough hopper, a hollow piston having an open end and a closed end, said open end opening into said hopper and attached thereto to form a throat therefor, a fixedly mounted open-ended cylinder fitted to said piston for a slidable pumping relationship therewith, a non-return valve mounted and positioned in said closed piston end so as to permit flow of dough therethrough in a direction away from said hopper, means to reciprocate said hopper and thereby reciprocate said piston and said cylinder having a closed end confronting said closed end of said piston and having outlet tubes; sleeves on said tubes; a fixed template disposed axially of said tubes adjacent the outlet ends thereof; means for periodically moving said sleeves toward said templates to cut off extruded dough rings; and means to time the movement of said sleeves with the completion of the movement of the hopper in the first mentioned direction; said means having a snap action with the total downward movement of the sleeves timed substantially with the end of the downward stroke of said piston.

6. A dough extrusion machine comprising: a dough hopper, a hollow piston having an open end and a closed end, said open end opening into said hopper and attached thereto to form a throat therefor, a fixedly mounted open-ended cylinder fitted to said piston for a slidable pumping relationship therewith, a non-return valve mounted and positioned in said closed piston end so as to permit flow of dough therethrough in a direction away from said hopper, means to reciprocate said hopper and thereby reciprocate said piston and said cylinder having a closed end confronting said closed end of said piston and having outlet tubes; sleeves on said tubes; a fixed template disposed axially of said tubes adjacent the outlet ends thereof; means for periodically moving said sleeves toward said templates to cut off extruded dough rings; said means having a snap action with the total downward movement of the sleeves timed substantially with the end of the downward stroke of said piston; said sleeves being biased to move downwardly; said hopper having means to raise said sleeves as the hopper is lowered; and means to release said sleeves when the hopper approaches the bottom of its stroke.

7. A dough extrusion machine comprising: a dough hopper, a hollow piston having an open end and a closed end, said open end opening into said hopper and attached thereto to form a throat therefor, a fixedly mounted open-ended cylinder fitted to said piston for a slidable pumping relationship therewith, a non-return valve mounted and positioned in said closed end of the piston so as to permit flow of dough therethrough in a direction away from said hopper, means to reciprocate said hopper and thereby reciprocate said piston, and said cylinder having a closed end confronting said closed end of said piston and having outlet tubes, and closed ends defining a dough compression chamber having capacity for only a limited quantity of dough approximately equal to the total amount of dough to be extruded into doughnut form for a single cycle of the machine, said valve being capable of admitting said quantity of dough into said fixed cylinder between said closed ends upon movement of the piston in one direction, the same quantity of dough being extruded through said outlet tubes in the working stroke of the piston in the opposite direction; means operatively associated with said outlet tubes to cut off dough extruded from said tubes, in the form of dough rings; and means to time the operation of the first mentioned means with the completion of the movement of the hopper in the first mentioned direction.

References Cited in the file of this patent

UNITED STATES PATENTS

| | | |
|---|---|---|
| 1,563,376 | King | Dec. 1, 1925 |
| 1,798,582 | Bergner | Mar. 31, 1931 |
| 1,866,061 | Schoel | July 5, 1932 |
| 1,866,332 | Toews | July 5, 1932 |
| 2,003,617 | Toews | June 4, 1935 |
| 2,032,420 | Kirwin | Mar. 3, 1936 |
| 2,230,094 | Tubbs | Jan. 28, 1941 |
| 2,246,758 | Roth | June 24, 1941 |
| 2,403,476 | Berry et al. | July 9, 1946 |
| 2,600,281 | Sticelber | June 10, 1952 |
| 2,635,560 | Coyne | Apr. 21, 1953 |